US005175820A

United States Patent [19]

Gephardt

[11] Patent Number: 5,175,820
[45] Date of Patent: Dec. 29, 1992

[54] APPARATUS FOR USE WITH A COMPUTING DEVICE CONTROLLING COMMUNICATIONS WITH A PLURALITY OF PERIPHERAL DEVICES INCLUDING A FEEDBACK BUS TO INDICATE OPERATIONAL MODES

[75] Inventor: Douglas D. Gephardt, Austin, Tex.

[73] Assignee: Advanced Micro Devices, Inc., Sunnyvale, Calif.

[21] Appl. No.: 800,862

[22] Filed: Oct. 25, 1991

Related U.S. Application Data

[63] Continuation of Ser. No. 576,017, Aug. 31, 1990, abandoned.

[51] Int. Cl.⁵ .............................................. G06F 5/00
[52] U.S. Cl. .............................. 395/275; 364/DIG. 1; 364/231.4; 364/238.3; 364/240.1; 364/242.6; 364/260.1; 364/DIG. 2; 364/927.93; 364/935.46; 364/942.04
[58] Field of Search ........................................ 395/275

[56] References Cited

U.S. PATENT DOCUMENTS

| | | | |
|---|---|---|---|
| 3,699,525 | 10/1972 | Klavins | 364/200 |
| 3,970,997 | 7/1976 | Daly et al. | 364/200 |
| 4,386,416 | 5/1983 | Giltner | 364/900 |
| 4,418,382 | 11/1983 | Larson et al. | 364/200 |
| 4,435,762 | 3/1984 | Milligan et al. | 364/200 |
| 4,608,689 | 8/1986 | Sato | 364/200 |

FOREIGN PATENT DOCUMENTS 59-38828  3/1984  Japan .
63-196968  8/1988  Japan .

Primary Examiner—Dale M. Shaw
Assistant Examiner—Robert S. Hauser
Attorney, Agent, or Firm—Foley & Lardner

[57] ABSTRACT

An apparatus for use with a computing device for controlling communications with a plurality of peripheral devices, each of which peripheral devices is operatively connected with a bus and is identified by an address. The apparatus comprises a control circuit for transmitting address information to the bus to effect interrogation of the plurality of peripheral devices, respective of the plurality of peripheral devices being responding, or ready, peripheral devices according to address information transmitted by the control circuit. A plurality of modal circuits are provided for establishing a plurality of operational modes for the apparatus, as well as a decision circuit for effecting designation of selected of the plurality of modal circuits. The responding peripheral device transmits a status code to the bus in response to appropriate address information received from the control circuit, which status code includes at least a first indicator identifying an appropriate operational mode for communication with the responding peripheral device. The decision circuit is responsive to the first indicator to effect the required designation to establish which of the plurality of modal circuits will be employed to establish the appropriate operational mode for the responding peripheral device.

7 Claims, 4 Drawing Sheets

APPARATUS FOR USE WITH A COMPUTING DEVICE CONTROLLING COMMUNICATIONS WITH A PLURALITY OF PERIPHERAL DEVICES INCLUDING A FEEDBACK BUS TO INDICATE OPERATIONAL MODES

This is a continuation of application Ser. No. 07/576,017 filed Aug. 31, 1990, abandoned.

CROSS REFERENCE TO RELATED APPLICATIONS

The following applications contain subject matter similar to the subject of this application.

(TT0091) U.S. patent application Ser. No. 07/576,012, filed Aug. 31, 1990; entitled "Integrated Digital Processing Apparatus";

(TT0092) U.S. patent application Ser. No. 07/576,601, filed Aug. 31, 1990; entitled "System for Effecting Communications Between a Computing Device and a Plurality of Peripheral Devices";

(TT0097) U.S. patent application Ser. No. 07/576,019, filed Aug. 31, 1990; entitled "System for Controlling Communications Among a Computer Processing Unit and a plurality of Peripheral Devices";

(TT0098) U.S. patent application Ser. No. 07/576,061, filed Aug. 31, 1990; entitled "Apparatus for Controlling Access to a Data Bus"; and (TT0099) U.S. patent application Ser. No. 07/576,695, filed Aug. 31, 1990; entitled "Apparatus for Use with a Computing Device for Generating a Substitute Acknowledgement to an Input when the Computing Device is in an Operational Hiatus".

BACKGROUND OF THE INVENTION

The present invention is directed to an apparatus for use with a computing device for controlling communications between that computing device and a plurality of peripheral devices.

Prior art systems for effecting such communications control generally have involved multiplexing between a synchronous clock and an asynchronous clock into a single-state bus controller.

The present invention, in its preferred embodiment, is intended for use with a bus controller system which polls peripheral devices by individual addresses and, upon receiving an indication that a respective peripheral device is ready to transfer information, the bus controller then obtains operational parameters associated with the ready peripheral device and incorporates those operational parameters in effecting the desired operation to be accomplished by the ready peripheral device. The present invention, in its preferred embodiment, receives appropriate of the operational parameters via a feedback bus and, based upon those operational parameters, selects either a synchronous mode or an asynchronous mode device for providing signals to a bus driver. The bus driver distributes information according to the ready device, or effects whatever other operation is to be accomplished by the ready device.

Thus, the choice of which of the two controllers, synchronous or asynchronous, is to be employed by the bus controller is based upon feedback information received from the ready peripheral device, rather than effecting a multiplexing between clocks into a single bus controller as practiced by prior art devices.

Such a novel approach in configuring a bus controller allows high speed peripherals to coexist on the same data bus as peripherals which require slower access cycles. The novel configuration of the present invention obviates any requirement for asynchronous, metastable, end-of-cycle feedback signals to be processed by the system. The result is improved efficiency of employment of data buses, easier accommodation of a wider variety of peripheral devices using common hardware, and faster aggregate operating speeds.

SUMMARY OF THE INVENTION

The invention is an apparatus for use with a computing device for controlling communications with a plurality of peripheral devices, each of which peripheral devices is operatively connected with a bus and is identified by an address. The apparatus comprises a control circuit for transmitting address information to the bus to effect interrogation of the plurality of peripheral devices, respective of the plurality of peripheral devices being responding, or ready, peripheral devices according to address information transmitted by the control circuit. A plurality of modal circuits are provided for establishing a plurality of operational modes for the apparatus, as well as a decision circuit for effecting designation of selected of the plurality of modal circuits. The responding peripheral device transmits a status code to the bus in response to appropriate address information received from the control circuit, which status code includes at least a first indicator identifying an appropriate operational mode for communication with the responding peripheral device. The decision circuit is responsive to the first indicator to effect the required designation to establish which of the plurality of modal circuits will be employed to establish the appropriate operational mode for the responding peripheral device.

It is, therefore, an object of the present invention to provide an apparatus for use with a computing device for controlling communications with a plurality of peripheral devices which provides a plurality of separate controller circuits for accommodating a plurality of different operational modes for communication.

A further object of the present invention is to provide an apparatus for use with a computing device for controlling communications with a plurality of peripheral devices which allows high speed peripherals to coexist on the same bus as peripherals which require slower access cycles.

Yet a further object of the present invention is to provide an apparatus for use with a computing device for controlling communications with a plurality of peripheral devices which obviates a requirement for asynchronous, metastable, end-of-cycle feedback signals to operate the apparatus.

Still a further object of the present invention is to provide an apparatus for use with a computing device for controlling communications with a plurality of peripheral devices which accommodates a variety of operational modes using common circuitry.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
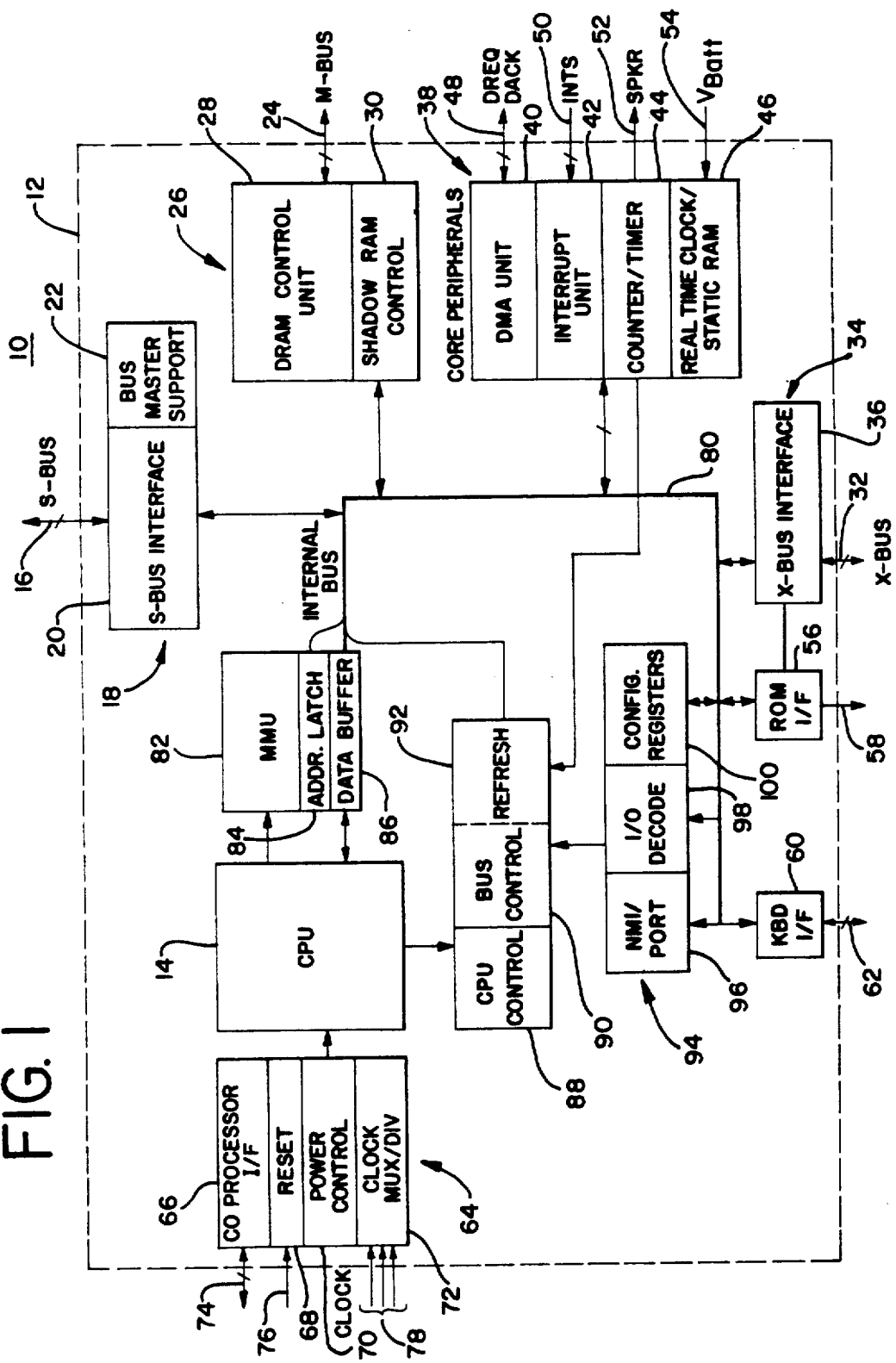
FIG. 1 is a system-level schematic drawing of a computing system appropriate for use with the preferred embodiment of the present invention.

FIG. 1 is a system-level schematic diagram of the preferred embodiment of the present invention. In FIG. 1, an apparatus 10 is illustrated as situated on a single substrate 12. Apparatus 10 includes a computer processing unit 14, a connection 16 for an S-bus (not shown) and supportive peripheral devices 18 comprising an S-bus interface circuit 20 and a bus master support circuit 22. S-bus supportive peripheral devices 18 are preferably configured to accommodate direct connection of an S-bus to apparatus 10 with no additional peripheral devices required for an effective operative connection.

Similarly, a connection 24 for an M-bus (not shown) has associated therewith M-bus supportive peripheral devices 26, including a dynamic random access memory (DRAM) control unit 28 and a shadow random access memory (RAM) control unit 30. Preferably, M-bus supportive peripheral devices 26 are configured to allow direct connection of the M-bus to M-bus connection 24 with no additional supportive peripheral devices required for an effective operative connection.

A connection 32 with an X-bus (not shown) is also provided for apparatus 10. Associated with X-bus connection 32 are X-bus supportive peripheral devices 34, including an X-bus interface 36. X-bus supportive peripheral devices 34 are preferably configured to allow direct connection of the X-bus to X-bus connection 32 with no additional peripheral devices required for an effective operative connection.

In the environment in which it is anticipated the preferred embodiment of the present invention would be employed, i.e., an AT-configured computing system, the S-bus is intended for use as a system-expansion bus to which would be connected industry-standard signal generators, timing devices, and other expansion cards and subsystems. Similarly, in such a preferred AT system configuration, the M-bus is used for communication to direct DRAM interfaces, while the X-bus is employed as an expansion bus to effect connection with such devices as read-only memories (ROMs), keyboard controllers, numeric co-processors, and the like.

Apparatus 10 further comprises a plurality of core peripheral devices 38 which include, by way of example, a direct memory access (DMA) unit 40, an interrupt unit 42, a counter/timer device 44, and a real time clock and static RAM device 46. The various core peripheral devices 38 are operatively connected to input-output pins in order to perform their intended function. Thus, DMA unit 40 is operatively connected with input-output pins 48 in order to receive data request signals (DREQ) and transmit data acknowledgement signals (DACK), interrupt unit 42 is operatively connected with input-output pins 50 in order to receive interrupt signals (Ints), counter/timer device 44 is operatively connected with input-output pins 52 to provide operative connection with a system speaker (Spkr), and real time clock and static RAM device 46 is operatively connected to input-output pins 54 in order to receive power from a power supply, such as VBatt.

While ROMs and keyboard controllers are connectable to apparatus 10 X-bus connection 32, the preferred embodiment of apparatus 10 illustrated in FIG. 1 also provides for direct ROM connection to a ROM interface 56 through an input-output pins 58. Similarly, a keyboard interface 60 is also provided for access to apparatus 10 via input-output pins 62.

Also illustrated in the system-level diagram of FIG. 1 are additional supportive peripheral devices 64, including a co-processor interface 66, a reset circuit 68, a power control circuit 70, and a clock multiplexer and divider unit 72. Input-output pins are provided for access to the various additional supportive peripheral devices 64 so that co-processor interface 66 is connected with input-output pins 74, reset circuit 68 is connected with input-output pins 76, and clock multiplexer divider unit 72 is connected with a plurality of input-output pins 78.

An internal bus 80 is provided to effect communications among the various components of apparatus 10, including S-bus supportive peripheral devices 18, M-bus supportive peripheral devices 26, X-bus supportive peripheral devices 34, core peripheral devices 38, and computer processing unit 14. Computer processing unit (CPU) 14 is operatively connected with internal bus 80 via memory management unit (MMU) 82 and its associated address latch 84 and data buffer 86.

Computer processing unit 14 is responsive to a CPU control device 88, which CPU control device 88 is in intimate communicational relation with a bus control device 90. Bus control device 90 is operatively connected with internal bus 80 and includes a refresh generator 92 which is responsive to counter/timer 44 to periodically refresh specified components of apparatus 10, such as dynamic RAMs (DRAMs) through DRAM control unit 28.

Internal supportive peripheral devices 94 are situated intermediate internal bus 80 and bus control circuit 90, including a non-maskable interrupt (NMI) control port 96, an input-output decode circuit 98, and configurable registers 100.

Thus, apparatus 10 provides appropriate bus-accommodating means such as S-bus supportive peripheral devices 18, M-bus supportive peripheral devices 26, and X-bus supportive peripheral devices 34, as well as ROM interface 56 and keyboard interface 60, to support direct connection of peripheral devices via data buses to apparatus 10 with no additional supportive peripheral devices required. Effective and efficient internal communications within apparatus 10 are provided by internal bus 80, access to which is controlled by bus control circuit 90 so that computer processing unit 14 may provide information to or receive information from any of the several supportive external buses via internal bus 80. Further, information may be exchanged among the various external buses according to bus control circuit 90, as dictated by the program driving computer processing unit 14, all via internal bus 80.

In its preferred embodiment, apparatus 10 is configured on a single substrate 12 as an integrated digital circuit, thereby providing the advantages of higher operating speed, lower power consumption, and reduced occupancy of "real estate" in its physical embodiment.

In order to facilitate understanding of the present invention, like elements will be indicated by like reference numerals in the various drawings.

Figure 2:
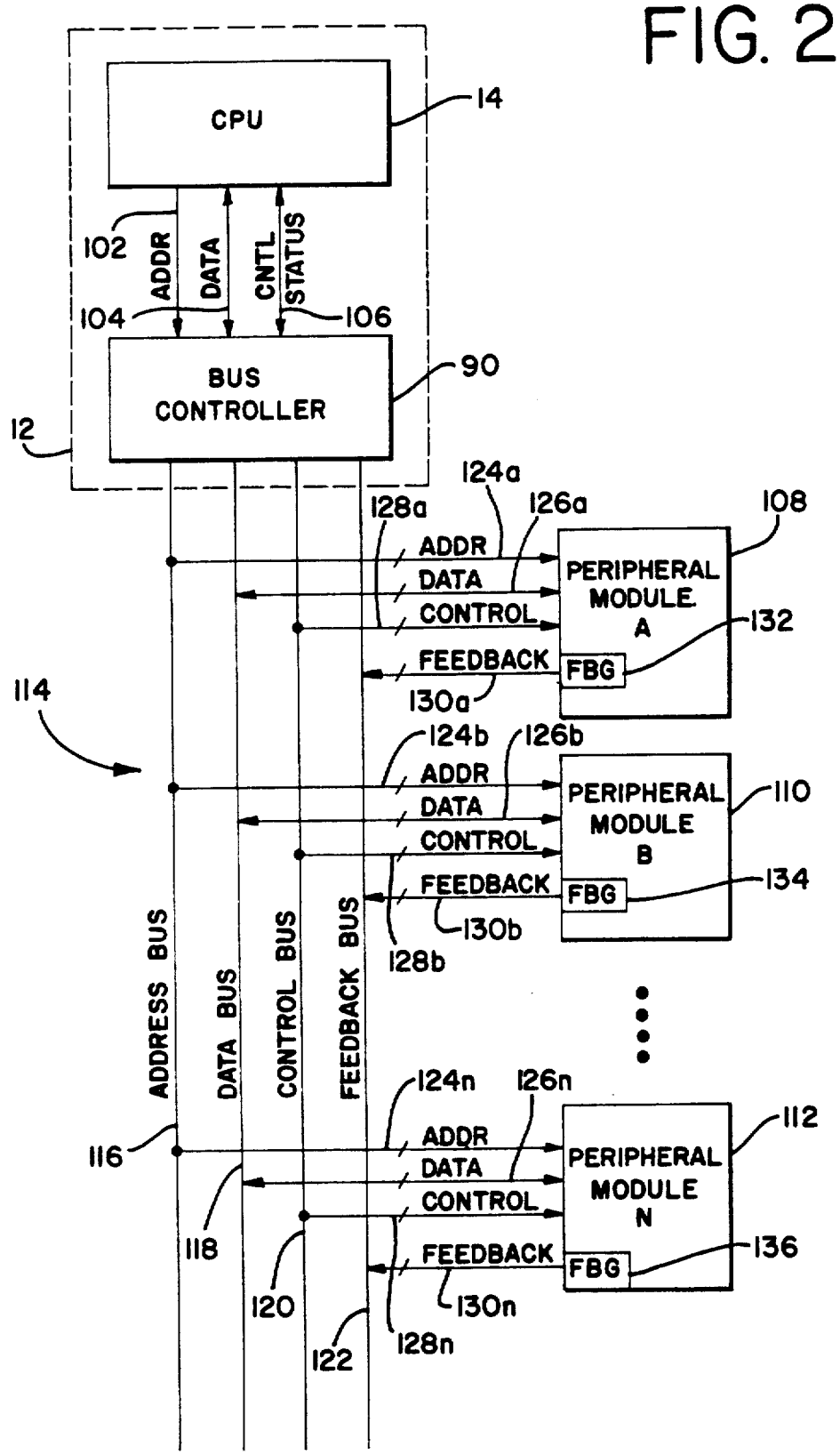
FIG. 2 is a schematic block diagram of a bus controlling system appropriate for use with the preferred embodiment of the present invention.

In FIG. 2, a computer processing unit 14 is operatively connected with a bus controller 90, which operative connection includes a CPU address bus 102, a CPU data bus 104, and a CPU control and status bus 106. Bus controller 90 is operatively connected with a plurality of peripheral modules 108, 110, 112 through a plurality of external buses 114. External buses 114 are external of substrate 12 upon Which CpU 14 and bus controller 90 are situated External buses 114 include an external address bus 116, an external data bus 118, an external control bus 120, and an external feedback bus 122.

Each of the peripheral modules 108, 110, 112 is operatively connected with external buses 114 by branch buses. Thus, peripheral module 108 is connected with external address bus 116 by branch address bus 124$_a$, connected with external data bus 118 by branch data bus 126$_a$, connected with external control bus 120 by branch control bus 128$_a$, and connected with external feedback bus 122 by branch feedback bus 130$_a$.

Similarly, peripheral module 110 is operatively connected with appropriate of external buses 114 by branch address bus 124$_b$, by branch data bus 126$_b$, by branch control bus 128$_b$, and by branch feedback bus 130$_b$.

Further, peripheral module 112 is connected with appropriate of external buses 114 by branch address bus 124$_n$, by branch data bus 126$_n$, by branch control bus 128$_n$, and by branch feedback bus 130$_n$.

Each of the branch feedback buses 130$_a$, 130$_b$, 130$_n$ is operatively connected with its respective peripheral module 108, 110, 112 by a feedback generator. Thus, branch feedback bus 130$_a$ is operatively connected with feedback generator 132 in peripheral module 108, branch feedback bus 130$_b$ is operatively connected with feedback generator 134 in peripheral module 110, and branch feedback bus 130$_n$ is operatively connected with feedback bus 136 in peripheral module 112.

Figure 3:
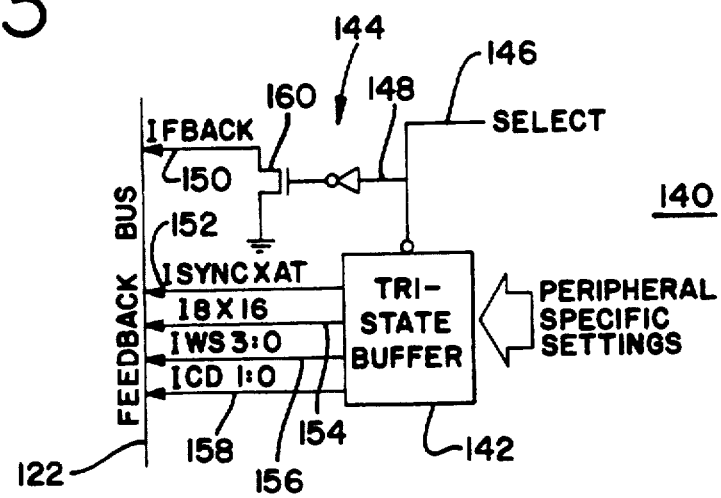
FIG. 3 is a schematic diagram of the feedback generator employed in the system illustrated in FIG. 2.

FIG. 3 is a schematic diagram of the feedback generator of the preferred embodiment of the present invention. In FIG. 3, a representative feedback generator 140 of the type employed in the system illustrated by FIG. 2 as feedback generator 132, 134, 136 is illustrated.

Feedback generator 140 comprises a tristate buffer 142 and a driver circuit 144. A select line 146 is connected to tristate buffer 142 and input 148 of driver circuit 144. Select line 146 preferably is provided from input-output decode circuit 98 (see FIG. 1). Specific settings for an associated peripheral module (such as peripheral modules 108, 110, 112 of FIG. 2) are set in tristate buffer 142. Branch feedback buses 130$_a$, 130$_b$, 130$_n$ (see FIG. 2) actually each comprise a plurality of bus trunks, illustrated as feedback bus trunks 150, 152, 154, 156, 158 in FIG. 3.

Driver circuit 144 is preferably configured as an open-drain driver circuit so that application of a select signal by select line 146 to input 148 of driver circuit 144 pulls output 160 of driver circuit 144 low. Output 160 is operatively connected with external feedback bus 122 and signals conveyed by output external feedback bus 122 comprise a signal IFBACK.

Feedback bus trunks 152, 154, 156, 158 convey operating parameter indicating signals to external feedback bus 122 from tristate buffer 142 and represent the operating parameters of the respective peripheral module associated with feedback generator 140. By way of example, feedback bus trunk 152 may convey a signal ISYNCXAT, indicating whether the respective peripheral module is to operate synchronously or asynchronously; feedback bus trunk 154 may convey a signal I8X16, indicating whether the respective peripheral module is of an 8-bit or 16-bit size; feedback bus trunk 156 may convey a signal IWS3:0, indicating the number of cycle wait states associated with the respective peripheral module (i.e., how many cycles are required for the intended operation of the respective peripheral module); and feedback bus trunk 158 may convey a signal ICD1:0, indicating a cycle command delay (i.e., how many cycles should pass from initiation of a command until actual actuation of the command). Preferably, none of the signals conveyed by feedback bus trunks 152, 154, 156, 158 are recognized by the system of FIG. 2 unless signal IFBACK is low.

Figure 4:
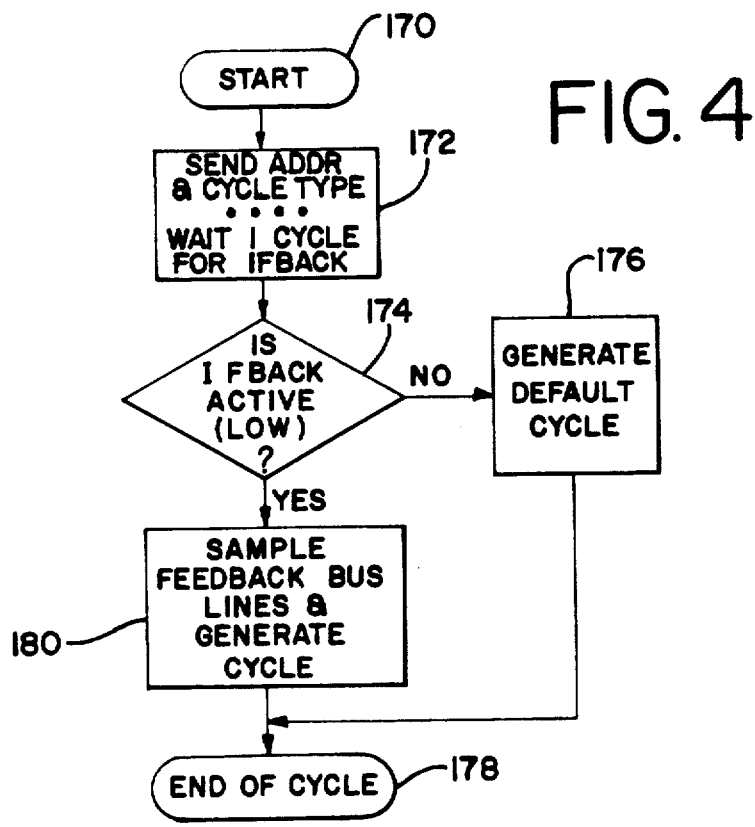
FIG. 4 is a flow diagram illustrating operation of the system illustrated in FIG. 2.

FIG. 4 is a flow diagram illustrating operation of the preferred embodiment of the present invention. In FIG. 4, a signal from CPU 14 (see FIG. 2) is operatively conveyed to bus controller 90 and thence forwarded by external address bus 116 to the peripheral modules 108, 110, 112. The cycle starts at block 170 of FIG. 4 and, by block 172, the address information and cycle-type information are sent via external address bus 116 and external control bus 120 to the various peripheral modules 108, 110, 112. Cycle-type information generally includes the type of operation to be effected in response to the command from CPU 14, such as a memory read or a memory write cycle, an input-output read or an input-output write cycle, or the like.

Further according to block 172, the system of FIG. 2 waits one cycle to check for a low signal IFBACK on external feedback bus 122. A low signal IFBACK provides a response to the query posed by block 174 whether there is an active signal IFBACK among the peripheral modules polled. If no low signal IFBACK is received by external feedback bus 122 at bus controller 90, then the "NO" branch is taken from block 174. Then, according to block 176, a default cycle is generated and the system proceeds immediately to the end of the cycle according to block 178. The system then awaits reinitiation of a cycle to begin at block 170 in response to a signal from CPU 14.

If a low signal IFBACK is detected, then the "YES" branch is taken from block 174. Then, according to block 180, feedback bus trunks 152, 154, 156, 158 are sampled in order to ascertain the operational parameters appropriate for the intended operation.

The appropriate cycle (i.e., the intended operation) for the active peripheral module is executed, after which the system proceeds to the end of the cycle according to block 178. The system then awaits reinitiation of a cycle to begin at block 170 in response to an appropriate signal from CPU 14.

Figure 5:
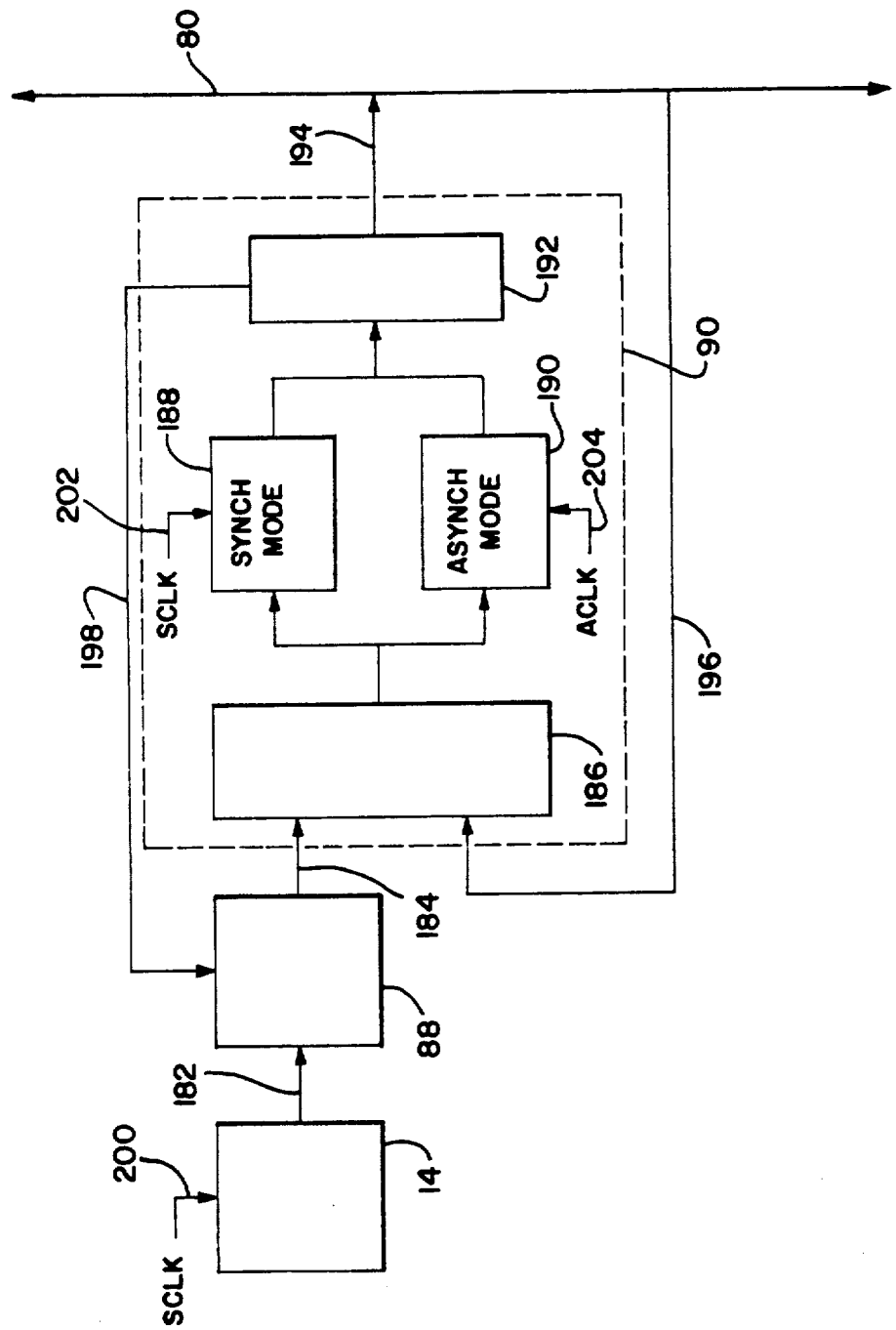
FIG. 5 is a schematic block diagram of the preferred embodiment of the present invention.

FIG. 5 is a schematic block diagram of the preferred embodiment of the present invention. In FIG. 5, a computer processing unit 14 is illustrated providing an output 182 to a computer processing unit controller 88. Computer processing controller 88 provides an output 184 to a bus control circuit 90. Bus control circuit 90 is comprised of a decision unit 186, a synchronous mode circuit 188, an asynchronous mode circuit 190, and a bus control line driver circuit 192. An output 194 from bus control line driver circuit 192 comprises the output of bus controller 90 and is operatively connected to internal bus 80.

The preferred embodiment of the present invention is being described in connection with its operative connection and use with internal bus 80 for controlling on-board peripherals situated or substrate 12 (see FIG. 1), but the inventive concept embodied in this disclosure is equally employable with bus interface circuitry involving external buses and their associated peripheral devices.

A feedback bus 196 is operatively connected to provide feedback signals from the peripheral devices (not shown) operatively connected with internal bus 80, through internal bus 80, to decision unit 186. A feedback line 198 is also provided from bus control line driver circuit 192 to computer processing unit control circuit 88 in order to communicate an end-of-cycle/ready for next operation signal to computer processing unit control circuit 88.

A synchronous clock input 200 is provided to computer processing unit 14, a synchronous clock input 202 is provided to synchronous mode circuit 188, and an asynchronous clock input 204 is provided to asynchronous mode circuit 190.

Synchronous mode circuit 188 and asynchronous mode circuit 190 are connected to be selectively included in the operative configuration of bus control circuit 90. Such selection is effected by decision unit 186 in response to signals received on feedback bus 196. The signals to affect the configuration established by decision unit 186 are received from peripheral devices (not shown) as part of the operational parameter information transmitted on feedback bus 196 in response to an address query to a respective peripheral module which has indicated it is ready for conducting operations.

Thus, in operation, the apparatus illustrated in FIG. 5 is cyclically operated with computer processing unit 14 starting a cycle according to a program. Computer processing unit controller 88 decodes status codes provided within output signals carried on output 182 and transmits address information and status code information by signals carried on output 184 to bus controller 90 and, specifically, to decision unit 186. Decision unit 186 samples feedback line 196 in response to address queries sent to the various peripheral devices operatively connected with bus 80, and, upon receiving indication of an activated and ready to operate peripheral device, receives operational parameter information via feedback bus 196.

The operational parameter information received via feedback bus 196 is employed by decision unit 186 to select the mode circuit for inclusion in the operative configuration of bus control circuit 90 which is appropriate to the activated respective peripheral device. That is, either synchronous mode circuit 188 or asynchronous mode circuit 190 will be selected by decision unit 186 as dictated by operational parameter information received via feedback bus 196 to ensure appropriate configuration of bus control circuit 90 to accommodate the operations to be performed by the respective peripheral device which has been activated. The selected mode circuit will generate control commands employing operational parameter information received via feedback bus 196 and, in conjunction with bus control line driver circuit 192, will drive appropriate command lines to control the bus to perform the operations required by the respective activated peripheral device.

It is to be understood that, while the detailed drawings and specific examples given describe preferred embodiments of the invention, they are for the purpose of illustration only, that the apparatus of the invention is not limited to the precise details and conditions disclosed and that various changes may be made therein without departing from the spirit of the invention which is defined by the following claims:

We claim:

1. An apparatus for use with a computing device for controlling communications among said computing device and a plurality of peripheral devices, each of said peripheral devices being identified by an address; the apparatus comprising:

a control means for controlling operation of the apparatus, said control means being operatively connected with said computing device and with a plurality of buses, said plurality of peripheral devices being operatively connected with said plurality of buses, said plurality of buses including an address bus, a data bus, and a feedback bus;

a plurality of modal means for establishing a plurality of operational modes for the apparatus;

a decision means for effecting designation of selected modal means of said plurality of modal means, said decision means being operatively connected with said computing device, with said feedback bus, with said control means, and with said plurality of modal means;

said control means conveying address information to said plurality of peripheral devices via said address bus, a selected peripheral device of said plurality of peripheral devices being a responding peripheral device according to a respective address, said respective address being included in said address information;

said responding peripheral device communicating a plurality of feedback signals via said feedback bus, said plurality of feedback signals being communicated from said responding peripheral device to said feedback bus via a plurality of parallel feedback bus trunks; said plurality of feedback signals conveying a plurality of appropriate indicators for identifying an appropriate operational mode for cooperation of said responding peripheral device with said computing device;

said decision means responding to said plurality of feedback signals to effect said designation to establish said appropriate operational mode.

2. An apparatus for use with a computing device for controlling communications among said computing device and a plurality of peripheral devices; each of said plurality of peripheral devices being identified by an address, the apparatus comprising:

a control means for controlling operation of the apparatus, said control means being operatively connected with said computing device;

a plurality of buses, said plurality of buses operatively connecting said control means with said plurality of peripheral devices, said plurality of buses including an address bus, a data bus, and a feedback bus;

said control means being operatively connected with said plurality of peripheral devices at least via said address bus and said feedback bus, said control means being responsive to said computing device to convey an address to said plurality of peripheral devices via said address bus; one peripheral device of said plurality of peripheral devices being a responding peripheral device according to said address;

said responding peripheral device conveying a plurality of feedback signals to said control means via said feedback bus;

said plurality of feedback signals being communicated from said responding peripheral device to said feedback bus via a plurality of parallel feedback bus trunks;

said control means including a plurality of sub-circuits, a respective set of sub-circuits of said plurality of sub-circuits being an appropriate set of sub-circuits according to said plurality of feedback signals, said control means being responsive to said plurality of feedback signals to operatively employ said appropriate set of sub-circuits and to operatively isolate all of said plurality of sub-circuits other than said appropriate set of sub-circuits.

3. An apparatus for use with a computing device for controlling communications among said computing device and a plurality of peripheral devices as recited in claim 2 wherein said control means conveys said address and said responding peripheral device conveys said plurality of feedback signals for each transfer of data effected by said computing device.

4. An apparatus for use with a computing device for controlling communications among said computing device and a plurality of peripheral devices as recited in claim 2 wherein said plurality of feedback signals includes parametral information regarding said responding peripheral device, said parametral information describing a predetermined operational profile for said responding peripheral device, said control means including means for recognizing said operational profile and configuring the apparatus for communications between said computing device and said responding peripheral device according to said operational profile.

5. An apparatus for use with a computing device for controlling communications among said computing device and a plurality of peripheral devices, each of said peripheral devices being identified by an address; the apparatus comprising:

a control means for controlling operation of the apparatus, said control means being operatively connected with said computing device and with a plurality of buses, said plurality of peripheral devices being operatively connected with said plurality of buses, said plurality of buses including an address bus, a data bus, and a feedback bus;

a plurality of modal means for establishing a plurality of operational modes for the apparatus;

a decision means for effecting designation of selected modal means of said plurality of modal means, said decision means being operatively connected with said computing device, with said feedback bus, with said control means, and with said plurality of modal means;

said control means conveying address information to said plurality of peripheral devices via said address bus, a selected peripheral device of said plurality of peripheral devices being a responding peripheral device according to a respective address, said respective address being included in said address information;

said responding peripheral device communicating a plurality of feedback signals via said feedback bus, said plurality of feedback signals being communicated from said responding peripheral device to said feedback bus via a plurality of parallel feedback bus trunks; said plurality of feedback signals conveying a plurality of appropriate indicators for identifying an appropriate operational made for cooperation of said responding peripheral device with said computing device;

said decision means responding to said plurality of feedback signals to effect said designation to establish said appropriate operational mode;

said plurality of modal means including a first modal means and a second modal means; said first modal means establishing a synchronous operational mode and said second modal means establishing an asynchronous operational mode, said decision means effecting said designation of either said first modal means or said second modal means as said selected modal means in response to said plurality of feedback signals.

6. An apparatus for use with a computing device for controlling communications among said computing device and a plurality of peripheral devices; each of said plurality of peripheral devices being identified by an address, the apparatus comprising:

a control means for controlling operation of the apparatus, said control means being operatively connected with said computing device;

a plurality of buses, said plurality of buses operatively connecting said control means with said plurality of peripheral devices, said plurality of buses including an address bus, a data bus, and a feedback bus;

said control means being operatively connected with said plurality of peripheral devices at least via said address bus and said feedback bus, said control means being responsive to said computing device to convey an address to said plurality of peripheral devices via said address bus; one peripheral device of said plurality of peripheral devices being a responding peripheral device according to said address;

said responding peripheral device conveying a plurality of feedback signals to said control means via said feedback bus;

said plurality of feedback signals being communicated from said responding peripheral device to said feedback bus via a plurality of parallel feedback bus trunks;

said control means including a plurality of sub-circuits, a respective set of sub-circuits of said plurality of sub-circuits being an appropriate set of sub-circuits according to said plurality of feedback signals, said control means being responsive to said plurality of feedback signals to operatively employ said appropriate set of sub-circuits and to operatively isolate all of said plurality of sub-circuits other than said appropriate set of sub-circuits;

said plurality of sub-circuits including a first sub-circuit and a second sub-circuit; said first sub-circuit being configured to effect synchronous communications between said control means and said responding peripheral devices, and said second sub-circuit being configured to effect asynchronous communications between said control means and said responding peripheral device, said control means operatively employing either said first sub-circuit or said second sub-circuit as said appropriate set of sub-circuits in response to said plurality of feedback circuits.

7. An apparatus for use with a computing device for controlling communications among said computing device and a plurality of peripheral devices as recited in claim 6 wherein said plurality of feedback signals includes parametral information regarding said responding peripheral device, said parametral information describing a predetermined operational profile for said responding peripheral device, said control means including means for recognizing said operational profile and configuring the apparatus for communications between said computing device and said responding peripheral device according to said operational profile.

* * * * *